Aug. 23, 1932.  A. URFER  1,873,684
COMPASS
Filed May 11, 1929

SUBSTITUTE FOR MISSING XR

INVENTOR.
ADOLF URFER
BY
Cooper, Kerr & Dunham
ATTORNEYS.

Patented Aug. 23, 1932

1,873,684

UNITED STATES PATENT OFFICE

ADOLF URFER, OF BROOKLYN, NEW YORK, ASSIGNOR TO PIONEER INSTRUMENT COMPANY, INCORPORATED, OF BROOKLYN, NEW YORK, A CORPORATION OF NEW YORK

COMPASS

Application filed May 11, 1929. Serial No. 362,188.

This invention relates to compasses and, more particularly, to means for providing illumination of the compass-card and lubber's line of liquid compasses.

The primary object of this invention is to provide means for effectively illuminating that portion of a compass-card which must be observed.

Another object of the invention is to provide illumination of the compass-card of a liquid compass without attendant objectionable reflections and by maintaining the compass unit dark except for the field of view upon the compass-card which is desired to be observed.

In accomplishing these objects light is introduced without the compass-bowl through an optically clear member, such as a glass rod, which is so positioned as to cause rays of light passing therethrough to be cast upon the compass-card. Depending upon the type of compass with which the invention is to be associated or upon the convenience permitted by a particular compass or compass mounting, the optically clear member is so positioned as to cause either direct or indirect illumination of the compass-card. Various ways of utilizing the invention are illustrated in the drawing, in which.

Figure 1:
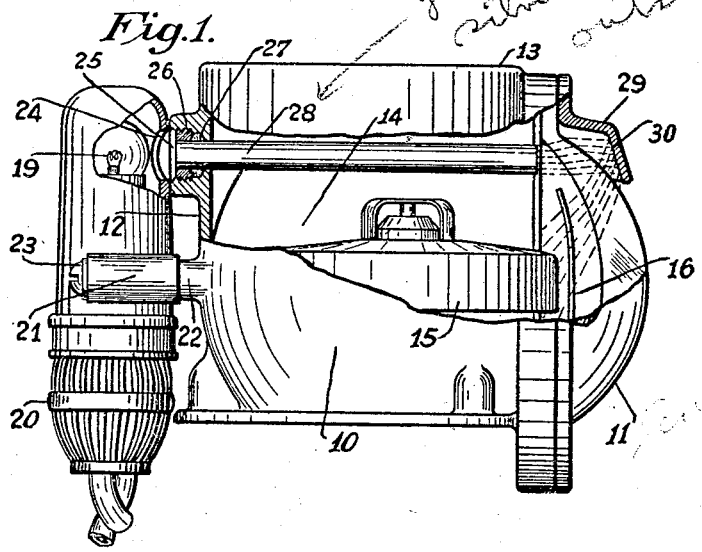
Fig. 1 is a side view of a compass-bowl with a portion thereof broken away so as to show the manner of illuminating, by reflection, the front of a compass-card.

The compass bowl 10, illustrated in Fig. 1 is of a type formed as a one-piece die-casting of which one side is left open for the purpose of mounting a lens 11. The compass-bowl is closed at its rear and sides by a wall 12 and at its top by another wall 13 all of which merge integrally and comprise a part of the die-casting. The compass-bowl 10 has a compass-card chamber 14 containing liquid and in which a compass-card 15 is mounted. A lubber's line 16 is properly disposed for facilitating reading of the compass-card.

The type of compass illustrated in Fig. 1 is intended to be used as an instrument mounted upon an instrument board of the character to be found on aircraft. The compass is so positioned upon the instrument board (not shown) as to permit the lens 11 to protrude from the rear of the instrument board. It is a very important consideration and a matter that directly affects the safeness desired to be obtained while piloting air-craft that instruments used for navigation purposes be correctly illuminated without, at the same time, permitting the existence of stray light which might serve to confuse a pilot and even make his instruments unreadable under certain circumstances.

By my invention I make it possible to illuminate the exact area or field of view of the compass-card and lubber's line of a liquid compass while maintaining all other portions of the compass substantially dark. This is accomplished by introducing light rays through a wall of the compass-bowl and so controlling their passage as to concentrate them upon the field of view desired to be illuminated. In the compass of the type illustrated in Fig. 1, I prefer to mount the source of light 19 at the rear of the compass, that is, in a position rearward of the instrument board. While the source of light 19 is illustrated as an electric bulb which is supported in a socket member 20, which in turn is carried by a mounting 21, it will be appreciated that some other manner of causing illumination may be used. The mounting 21 is secured to a boss 22 by means of one or more screws 23 and I have found it convenient to design the mounting as a jacket enclosing the source of light. An opening 24 through which light may pass to the interior of the compass-bowl is made in the wall of the jacket 21. This opening is so positioned as to be opposite a similar opening 25 in the wall of the compass-bowl. Opening 25 has a bushing 26, which with the assistance of a gasket 27, serves to support a glass rod 28. This glass rod constitutes optically clear means by which light emitted from the source of light 19 may be carried through the substantially opaque wall of the compass-bowl without substantial diminution of intensity of illumination. I have used a rod, round in cross-section, but the form to be used is mostly a matter of convenience and choice.

In order to efficiently transmit light and prevent loss thereof from the glass rod 28, at portions which are not intended to permit the escape of light, I cause the exterior of the glass rod 28 to be coated by an opaque coating such as silver. The coating used should preferably have reflecting qualities. This coating extends along the length of the rod but does not cover the ends when prepared for use in the manner illustrated in Fig. 1. The construction of the rod suggested is one which permits efficient transmission of light from one end of the rod to the other end of the rod and its free passage therethrough.

Because of the position of the field of view desired to be observed upon the compass-card relative to the side wall or walls of a compass-bowl, it is desirable that some means be employed for the purpose of reflecting the light caused to enter within the interior of a compass-bowl from the exterior side of a wall. Accordingly, as illustrated in Fig. 1 I have provided a shield 29 having polished reflecting surface 30 thereon which is at such an angle as to reflect the light received through the glass rod onto the field of view desired to be observed upon the compass-card. This is an advantageous arrangement since it is very desirable that a small area of the compass-card be illuminated. Actually, it is only necessary to illuminate the lubber's line 16 and a small portion of the compass-card 15 to the left and right of the lubber's line. It will be appreciated that the reflecting surface 30 may be so formed as to direct the rays reflected therefrom in such a manner as to illuminate only the areas of the compass-card desired to be illuminated.

Figure 2:
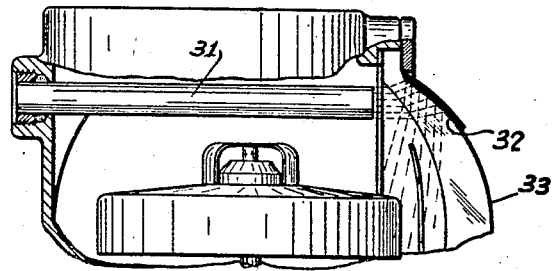
Fig. 2 is a view illustrating the use of the surface of a lens or cover-glass for reflecting light.

In Fig. 2 I have illustrated a glass rod 31 in the same position and in the same relation as the glass rod 28 bears to the compass-bowl in Fig. 1. However, in place of a specially constructed shield for the purpose of reflecting light upon the compass-card, I utilize in this instance, the outer surface 32 of the spherical lens 33 as a reflecting surface. The light leaving the glass rod 31 is directed against the convex surface of the lens which is so shaped as to reflect this light upon the portion of the compass-card to be observed. In order that the reflecting conditions may be at their very best, it is preferable that surface 32 be silvered.

Figure 3:
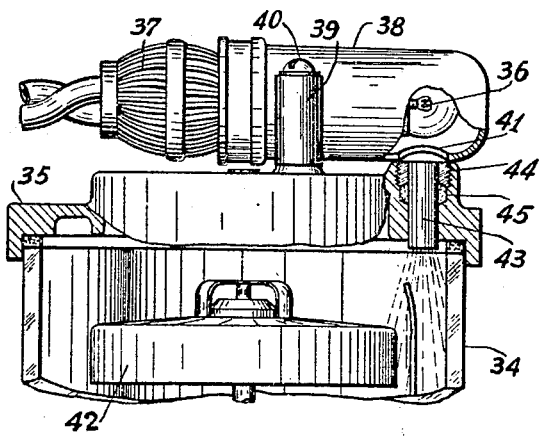
Fig. 3 illustrates an installation by which light may be caused to fall directly upon the compass-card without reflection.

In Fig. 3, I have illustrated my invention in connection with a type of liquid compass which is intended to be used where conditions are such as to permit the reading of the compass from any point about the exterior of the compass. This unit includes a glass wall 34 in the form of a sleeve with its axis vertically disposed. A lower wall (not shown) and an upper wall 35 close the ends of the sleeve. In this type of a compass I mount the source of light 36 in a socket 37 carried by a jacket 38. Jacket 38 has lugs 39 one on each side, by which it may be attached to the top wall 35 by means of screws 40 or like fastening means. Jacket 38 has an opening 41 through which light may be permitted to pass. In this type of compass, the source of light may be placed exteriorly of one of the walls closing the ends of the vertically disposed glass sleeve 34, and the compass-card 42 may be thereby illuminated without reflection. Accordingly, a glass rod 43 is placed within an aperture in the wall 35 and it is held therein by means of a nut 44 and gasket 45. In view of the fact that this rod need not be of an extensive length, the surface thereof need not be silvered since it will be completely encased by the material of the cover 35, the nut 44 and gasket 45. However, the use of a silvered rod is optional, but its use would permit the most efficient transmission of light to be had. It will be appreciated that the light passing through the glass rod from the source of light will be cast directly upon the field of view desired to be observed and that for this purpose the rod may be curved or of any length to suit the problem presented in equipping various types of compasses.

My invention is capable of a wide variation and relationship of parts without departure from the nature and principle thereof and I do not restrict myself unessentially in the foregoing or other particulars, but contemplate such alterations and modifications within the scope of the appended claims as may be found to be advisable.

What I claim is:

1. The combination with a compass bowl containing liquid and a compass-card therein, of an optically clear member passing through a wall of said compass-bowl, a source of light disposed in the vicinity of one end of said optically clear member, reflecting means located so as to reflect light passing through said optically clear member upon the compass-card, and a source of light disposed in the vicinity of one end of said optically clear member whereby light therefrom may be introduced to the interior of said compass-bowl through said optically clear member.

2. The combination with a compass-bowl containing liquid and a compass-card therein, of a glass rod passing through a wall of said compass-bowl, said rod being coated along its length to prevent escape of light therefrom, a reflecting surface positioned so as to receive light passing through said rod and reflect the same upon the compass-card, and a source of light exterior of the compass-bowl whereby the interior of said rod may be illuminated.

3. In combination, a compass-bowl having an opaque wall, a compass-card within said compass-bowl and surrounded with liquid, and optically clear means passing through said wall permitting the passage of light from the exterior of the wall to the interior of the compass-bowl, said optically clear means extending through the liquid and having a substantially opaque coating thereon preventing the escape of light within the compass-bowl except as directed on said compass-card.

4. In combination, a compass-bowl comprising a wall of opaque material and a lens, said compass-bowl containing liquid, a compass-card viewable through said lens, a glass rod passing through said wall of opaque material and having a portion thereof immersed in the liquid, a socket member mounted on the outside of said wall, and a lamp carried by said socket member and disposed opposite the end of said rod where it enters the compass-bowl whereby light is directed from the outside of the wall through the glass rod and liquid, and to the compass-card.

5. In combination, a compass-bowl comprising a wall of opaque material and a lens mounted in a vertical opening of said wall, said compass-bowl containing liquid, a compass-card having a vertical surface with indices thereon viewable through said lens, a glass rod mounted in the rear wall of the compass-bowl and extending through the liquid, said glass rod terminating in the vicinity of the area of the lubber's line at the front of the compass, a source of light in the vicinity of the outside end of said glass rod, and means for reflecting light transmitted from said source of light through said glass rod onto the lubber's line.

6. In combination, a compass-bowl comprising a wall of opaque material and a lens containing liquid, said lens being vertically disposed in a vertical opening of the wall, a compass-card viewable through said lens, a glass rod mounted in the wall opposite the lens and extending across the compass-bowl, a reflecting surface comprising surfaces of said lens whereby light transmitted through said glass rod is reflected to the compass-card, and a light mounted outside of said compass-bowl opposite the end of said glass rod which is mounted in the wall.

7. In combination, a compass-bowl comprising a wall of opaque material and a lens containing liquid, said lens being vertically disposed in a vertical opening of the wall, a compass-card viewable through said lens, a glass rod mounted in the wall opposite the lens and extending across the compass-bowl, a reflecting member to receive light transmitted through said glass rod and to reflect the same through said lens to the compass-card, said reflecting member being mounted in a position outside of said compass-bowl and forward of said lens, and illumination means in the vicinity of the end of said rod which passes through the wall of the compass-bowl.

8. In combination, a compass-bowl comprising a glass wall in the form of a sleeve which is vertically disposed and closed at its ends, said compass-bowl containing liquid and a compass-card, a glass rod mounted in the upper end wall of said compass-bowl with its axis in line with the portion of the compass-card desired to be observed, and a source of light disposed exteriorly of said upper end wall in the vicinity of the upper end of said glass rod whereby light may be directed through said glass rod and liquid and onto said compass-card.

9. In combination, a compass-bowl comprising a glass wall in the form of a sleeve which is vertically disposed and closed at its ends, said compass-bowl containing liquid and a compass-card, a glass rod mounted in the upper end wall with its axis in line with the portion of the compass-card desired to be observed, a lamp mounting comprising a jacket fixed to the upper end wall, said jacket having an opening therein opposite the end of said glass rod at the outside of said wall, and a lamp mounted in said jacket opposite said opening whereby illumination from said lamp may be directed through said glass rod and onto said compass-card.

10. In combination with a compass bowl having a compass-card therein, of an optically clear member extending through a wall of said compass-bowl, said member being coated with opaque material along its length to prevent the escape of light rays therefrom, a source of light disposed exteriorly of the compass-bowl and in the vicinity of one end of said optically clear member, and means disposed at the other end of said member whereby light from said source may be introduced to the interior of said compass-bowl through said member.

11. The combination with a compass-bowl containing liquid and a compass card therein, of a cover glass through which the card may be viewed, an optically clear member having an opaque surface and extending through a wall of said compass-bowl into said liquid, and a source of light disposed in the vicinity of one end of said optically clear member so that light from said source may be introduced to the interior of the compass-bowl through said optically clear member without producing an external glare from the cover glass.

12. The combination with a compass-bowl containing liquid and a compass card therein of a cover glass through which the card may be viewed, a source of light disposed externally of said compass-bowl and enclosed so as to shut out light externally of the compass-bowl, and means for directing the light from said source through the compass-bowl and through the liquid onto the compass card without producing an external glare from the cover glass and also for preventing refraction of light through the liquid.

13. The combination with a compass-bowl containing liquid and a compass card therein of a cover glass through which the card may be viewed, a source of light disposed externally of said compass-bowl, and means for directing the light from said source through the compass-bowl and through the liquid onto the compass card without producing an external glare from the cover glass and also for preventing refraction of light through the liquid.

In testimony whereof I hereto affix my signature.

ADOLF URFER.